June 4, 1968  KINGO MIYAHARA  3,386,436
WATER HEATERS
Filed Oct. 27, 1966
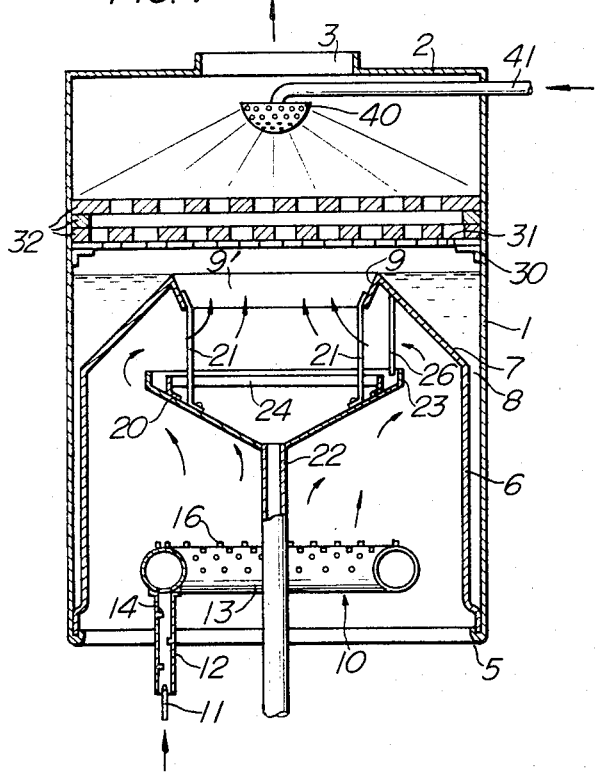
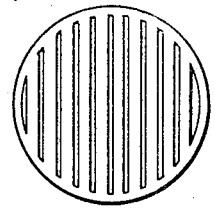
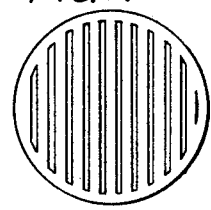
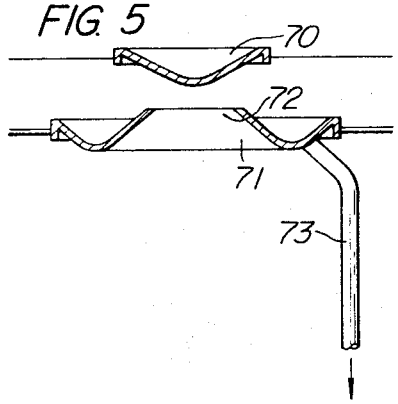
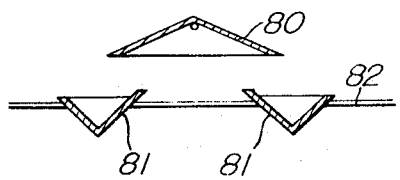

United States Patent Office 3,386,436
Patented June 4, 1968

3,386,436
WATER HEATERS
Kingo Miyahara, 7—4 Yagumo, 3-chome, Meguro-ku, Tokyo, Japan
Filed Oct. 27, 1966, Ser. No. 589,872
Claims priority, application Japan, Oct. 28, 1965, 40/87,667; Nov. 5, 1965, 40/89,672; May 6, 1966, 41/28,600; June 22, 1966, 41/58,913
8 Claims. (Cl. 126—359)

ABSTRACT OF THE DISCLOSURE

A water heater including a casing having a water sprinkler at its top end, a plurality of stacked horizontal grate-like heat exchanging elements disposed below the sprinkler, a protective inner wall defining a water chamber, and a burner covering means wherein the water from the sprinkler passes through the heat exchanging elements and falls into the water chamber and the burner covering means and hot gasses from the burner ascend from the bottom to the top of the casing and heat the descending water via the heat exchanging elements, the inner wall, the burner covering means and by direct contact.

---

The present invention relates to a water heater and more particularly to a water heater of the type in which heat exchange is effected by the direct contact of the combustion gas from a burner with water from a sprinkler.

According to the present invention, there is provided a water heater comprising a casing having a gas exhaust opening at its top end, sprinkler means for ejecting water disposed in the upper portion interior of said casing, a burner assembly disposed in the lower portion interior of said casing, heat exchanging elements disposed below said sprinkler means to provide an expanded contact area by means of which the combustion gas from said burner assembly is caused to contact the water dropping from said sprinkler means during its ascending movement towards said gas exhaust opening, water receiving means for receiving the heated water dropping through said heat exchanging elements to thereby prevent said heated water from falling on said burner assembly and providing for further heating of said heated water received therein and a water discharge opening, said water receiving means consisting of casing protecting means surrounding said burner assembly and having its top end open and its lower end connected peripherally to said casing in a water-tight relation so as to form a water reservoir between it and the peripheral wall of said casing and burner covering means disposed between said heat exchanging elements and said burner assembly and having at least one water reservoir element.

The water heater of the instant invention is advantageous in that, in addition to the heat exchange by the aforementioned direct contact of the combustion gas with water, heat exchange is further effected through the respective walls of the casing protecting means and the burner covering means, heating the water chamber formed between said casing protective wall and the side wall of the casing and the water reservoir formed on the upper side of said burner covering means respectively, and also in that possible damage to the peripheral wall of the casing and burner covering means due to heat can be avoided by the presence of both of said water chambers. Another advantage of the invention is that, by the use of a burner assembly of a special construction, it has been made possible to burn a large amount of gas with a small-sized burner and thereby to obtain hot water in a large amount from a small-sized water heater owing to the efficient heat exchange mentioned above.

The present invention will now be described in further detail with reference to the accompanying drawing, in which:

FIGURE 1 is a diagrammatic vertical cross section of an embodiment of the water heater according to the present invention;

FIGURES 2, 3 and 4 respectively are plan views of the bottom, intermediate and top heat exchanging elements used in the water heater shown in FIG. 1; and FIGURES 5 and 6 respectively are modifications of the burner covering means.

Referring to the drawing, a casing 1 which is cylindrical in shape is made of stainless steel. The lower end of the casing 1 is open while the top end thereof is provided with an end plate 2 having a gas exhaust opening 3 formed in the center thereof. The lower peripheral edge of the casing 1 is buckled inwardly to embrace the lower peripheral edge of a protective inner wall 6 in a water-tight relation, so as to form a water chamber 8 between said protective inner wall 6 and said casing 1. The upper portion of the protective inner wall 6 is converged inwardly as indicated at 7 to form a frusto-conical configuration and accordingly the width of the water chamber 8 is increased in this portion. The uppermost edge 9 of the protective inner wall 6 is flexed downwardly to form a peripheral wall defining an opening 9'.

In the lower portion interior of the casing 1 is disposed a burner assembly 10 which is of a special construction described hereinbelow which is designed for burning a large amount of gas with a small burner structure. Namely, a gas ejecting nozzle 11 is inserted into a tubular mixing chamber 12 which has interference plates 14 attached zigzag to the inner wall thereof, so that a large amount of gas may be thoroughly mixed with a large amount of air in the short mixing chamber to be burnt easily. The mixing chamber 12 is connected to a horizontal doughnut-shaped burner element 16 which is provided with a number of orifices for ejecting the combustion flame therethrough. These orifices are concentrated on the upper inner side of the element 16 so that the flames are converged inwardly of said element 16. Each orifice is open in the center of the tip end of a projection formed on the exterior surface of said element 16. Since the water heater of the invention is capable of heating a large amount of water, in spite of it being small in size, a burner to be employed is also preferably large in capacity and small in size.

Disposed in the uppermost portion interior of the casing 1 is a sprinkler 40 into which water to be heated is introduced through a pipe 41. Below the sprinkler there is provided a screen 31 for receiving the water ejected through the sprinkler, which screen is supported on the casing by means of a stopper 30 and three grate-like heat exchanging elements 32 as shown in FIGS. 2, 3 and 4 are mounted on the screen in superposed relation. The heat exchanging elements 32 are made of a heat-resistant ceramic ware and each element is composed of a circumferential member in peripheral alignment with the inner wall of the casing and a number of integral rod members arranged inside of said circumferential member. The rod members in each element are arranged such that, when these three elements are placed one on another, the rod members of adjacent elements are crossed at right angles to each other and the space between adjacent rod members of one element is closed, as viewed from the top, by a rod member of the element next to the adjacent one, so as not to permit water from the sprinkler to pass through the stack of elements without contacting any one of the elements. Obviously the thermal efficiency to be obtained increases with the number of the heat exchanging elements in the stack increasing.

A burner covering means 20 is provided below the top opening 9' of the inner wall 6 to receive the water dropping through said opening. In the embodiment shown in FIG. 1, this burner covering means 20 is an inverted cone-shaped hollow body and is suspended from the inner wall 6 by suitable supporting members 21. A heated water discharge pipe 22 is extending from the bottom of the burner covering means 20, through which the heated water is discharged exterior of the casing as desired. On the conical wall of the burning covering means 20, there is provided a peripheral wall member 24 in the proximity of the upper edge 23 of said burner covering means which together with said upper edge 23 forms a water reservoir. A part of the water accumulated in the water chamber 8 is introduced into said water reservoir and the water overflowing said water reservoir drops into the burning covering means 20. The burner covering means 20 also receives the water overflowing the water chamber 8 and the water dropping through the heat exchanging elements 32. The burner covering means 20 may be composed of a cup-shaped water receptacle 70 and an annular water receptacle 71 arranged below said water receptacle 70 in spaced relation as shown in FIG. 5. In this case, the combustion gas ascends through a central hole 72 in the water receptacle 71 and collides against the water receptacle 70. The heated water in the water receptacle 71 is discharged through a pipe 73, while the heated water overflowing the water receptacle 70 drops into the water receptacle 71 to be accumulated therein.

Alternatively, the burner covering means 20 may be composed of a combination of a roof-shaped rectangular cover 80 and a trough-like elongate water receptacle 81. In this case, the water receptacle 81 is supported by a plurality of supporting metal rods 82 which are secured to the inner wall 6, and a suitable heated water collecting means is provided.

According to the inventive water heater which is constructed as described hereinabove, since heat exchange takes place through the wall of the casing protective water chamber 8 and the wall of the burner covering water receptacle 20, heating the water in said water chamber 8 and water receptacle 20 respectively, in addition to the direct heat exchange taken place on the surfaces of the heat exchanging elements 32, heat exchange can be effected within a narrow space in an efficient manner and, in addition, the water dropping from the sprinkler 40 through the heat exchanging elements 32 falls into the burner covering water receptacle 20 while being heated by a large amount of combustion gas from the burner ascending through the space between the water receptacle 20 and the inner wall 6 of the water chamber 8 and said burner is protected from said water by said burner covering means 20 and casing protective inner wall 6.

It should be understood that the casing may have an oval or rectangular cross sectional configuration instead of the circular configuration as shown in the embodiment illustrated herein and in this case the configurations of the interior elements are obviously changed accordingly.

What is claimed is:
1. A water heater comprising a casing having a gas exhaust opening at its top end, sprinkler means for ejecting water disposed in an upper portion of said casing, a burner assembly disposed in a lower portion of said casing, heat exchanging means disposed below said sprinkler means to provide an expanded area for combustion gas from said burner assembly to contact the water from said sprinkler means during ascension of the combustion gas towards said gas exhaust opening, water receiving means including casing protecting means surrounding said burner assembly and having its top end open and its lower end connected peripherally to said casing to form a water chamber therebetween for receiving water dropping through said heat exchanging means and further heating the water, and burner covering means disposed between said heat exchanging means and said burner assembly having means for receiving water overflowing the water chamber and water dropping from said heat exchanging means for further heating the water and preventing the water from falling on said burner assembly, and water discharge means connected with said water receiving means for discharging heated water.

2. A water heater according to claim 1, in which said casing protecting means is formed in an upwardly converged frusto-conical shape and said burner covering means is disposed below the top end of said casing protecting means so that the water overflowing the water chamber formed by said casing protecting means drops into said burner covering means.

3. A water heater according to claim 1 in which said casing protecting means has an upper peripheral edge sloping down into the center of said casing and said burner covering means is formed in an upwardly open conical shape, the top edge of said burner covering means being arranged below the sloping peripheral edge of said casing protecting means so that the water overflowing said casing protecting means is received in said burner covering means.

4. A water heater according to claim 1, in which said heat exchanging means include a plurality of horizontal grate-like elements each having parallel rod members arranged in one plane in spaced relation and a horizontal screen supported by said casing and supporting said grate-like elements superposed one on another in such a manner that the rod members of adjacent elements are crossed at right angles to each other.

5. A water heater according to claim 4, in which said heat exchanging means includes at least three of said grate-like elements which are superposed one on another in such a manner that the space between adjacent rod members of the lowermost element is closed as viewed from the top by a rod member of the third element from the bottom so that water from said sprinkler means is not permitted to pass through said space rectilinearly.

6. A water heater according to claim 5, in which each of said grate-like elements includes a surrounding rod member of a configuration conforming to the interior configuration of the casing and integral rectilinear rod members arranged in parallel spaced relation.

7. A water heater according to claim 1, in which said casing is circular in horizontal cross section.

8. A water heater according to claim 1 wherein said burner assembly includes a hollow annular body with a number of orifices therein, at least one air-gas mixing chamber communicating with the annular body having interference pieces on the interior thereof, and a gas nozzle and means for providing atmospheric air associated with each of the mixing chambers.

References Cited
UNITED STATES PATENTS

| | | | |
|---|---|---|---|
| 383,921 | 6/1888 | Sugg | 126—355 |
| 884,223 | 4/1908 | Shipley | 126—359 |
| 893,084 | 7/1908 | Loomis | 126—359 |
| 1,744,523 | 1/1930 | Cannon | 126—359 |
| 3,190,283 | 6/1965 | Miyahara | 126—359 |

JAMES W. WESTHAVER, *Primary Examiner.*